INVENTOR.
JOHN CURLETT

United States Patent Office 3,439,553
Patented Apr. 22, 1969

3,439,553
TRANSMISSION
John Curlett, Los Gatos, Calif., assignor to Gurries Manufacturing Co., San Jose, Calif., a corporation of California
Filed May 16, 1966, Ser. No. 550,492
Int. Cl. F16h 1/28
U.S. Cl. 74—409    5 Claims

ABSTRACT OF THE DISCLOSURE

A transmission including a plurality of planetary gear stages together with means for applying a periodic variable torque to the gear stages to eliminate gear back lash and frictional losses.

---

Figure 1:
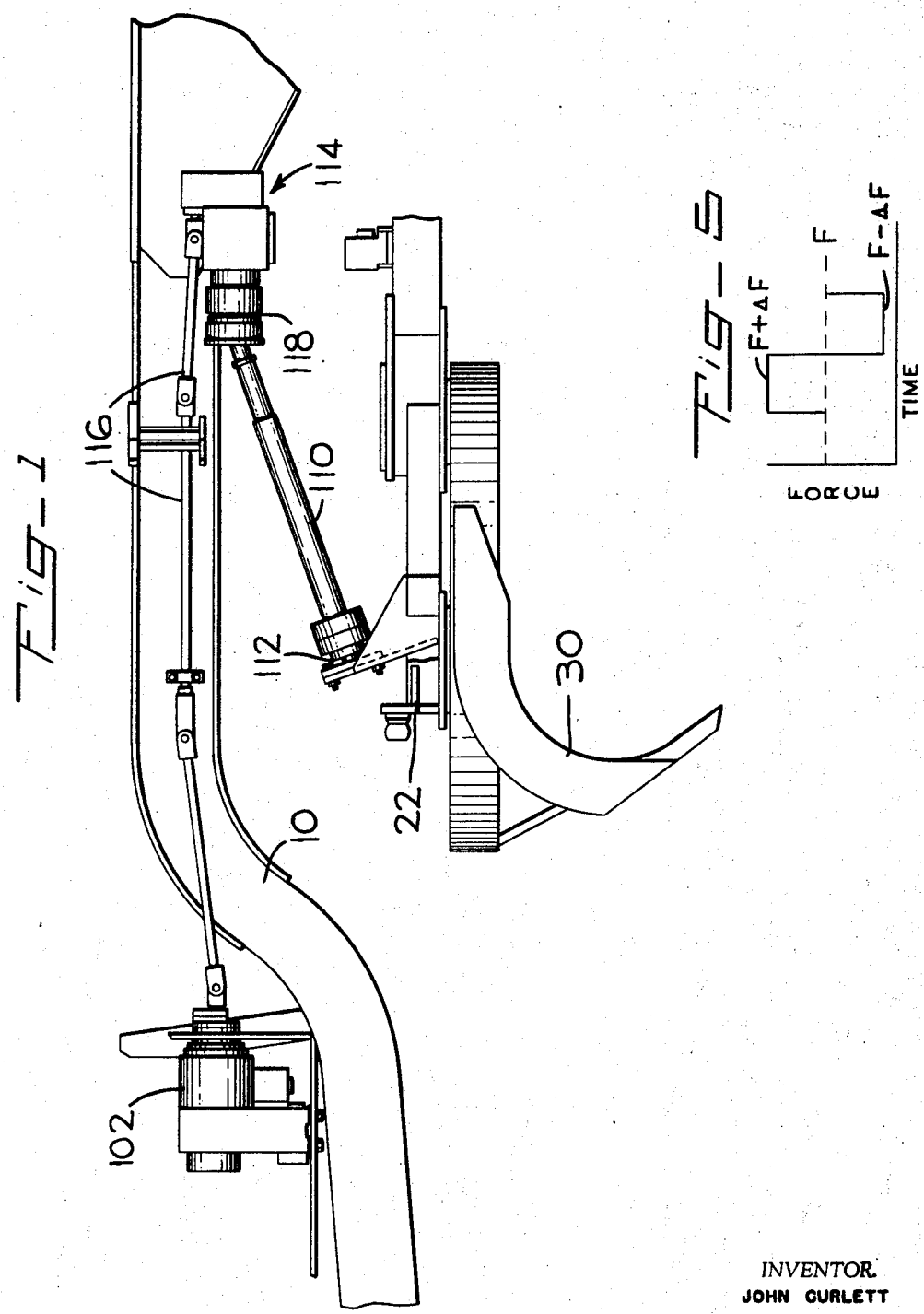

The present invention relates generally to transmissions and more particularly to a mechanical transmission arranged to amplify or reduce rotary motion.

There are obviously innumerable applications where the amplification or reduction of an input motion is desired. Certain of these are primarily concerned with the amplification or reduction of a transmitted force while others, to which the present invention is primarily directed, are more concerned with the precise reduction or amplification of the amount of rotary motion. By way of example, the change in the cross-slope of the earthmoving blade of a road-grader provides a rotary motion input which requires amplification for ultimate control purposes. It will be apparent that if such control is to be accurate, the amplification must be performed with precision so that a small increment of input motion will be faithfully reproduced in amplified form at the output. Since present requirements for road grading necessitate an accuracy of no more than one-eighth of an inch across a ten foot span, it has become apparent that conventional gear boxes are totally inadequate to provide the requisite degree of accuracy.

Accordingly, it is a general object of the present invention to provide a transmission capable of amplifying or reducing rotary motion in a fashion such that a precise correlation between the input and output motions is achieved.

More particularly, it is a feature of the invention to provide a transmission that has an extremely low motion threshold which, as generally defined, designates, the minimal amount of input rotary motion requisite to instigate output rotary motion. By way of example, the motion threshold of an amplification transmission having an overall step-up ratio of approximately 150 is maintained substantially at zero in accordance with the present invention.

It is an additional feature of the invention to provide a transmission for the amplification or reduction of rotary motion arranged so that overall frictional losses are minimized wherefore the ultimate accuracy of the correlation between input and output motions is maximized.

It is yet another significant feature of the invention to provide a transmission wherein a secondary oscillating input to the transmission is arranged to periodically add force components in opposite directions to further enhance accuracy of motion transmission.

More particularly, it is a feature to provide such oscillating input in an amount sufficient so that a periodic reversal of frictional effects is experienced and inaccuracies resultant from frictional losses are effectively eliminated.

Additionally, said oscillating input is arranged to provide a variant torsional force always acting in one direction wherefore effects such as gear lash are eliminated.

More particularly, it is a feature to provide for accuracy of motion transmission in a motion amplifier through the use of a multiplicity of amplification stages arranged so that a minimization of frictional and other effects deleterious to accuracy is attained.

Yet more specifically, it is a feature of the invention to provide a transmission wherein the accuracy is maximized through the particular design arrangement of gearing and bearing therefor.

Figure 2:
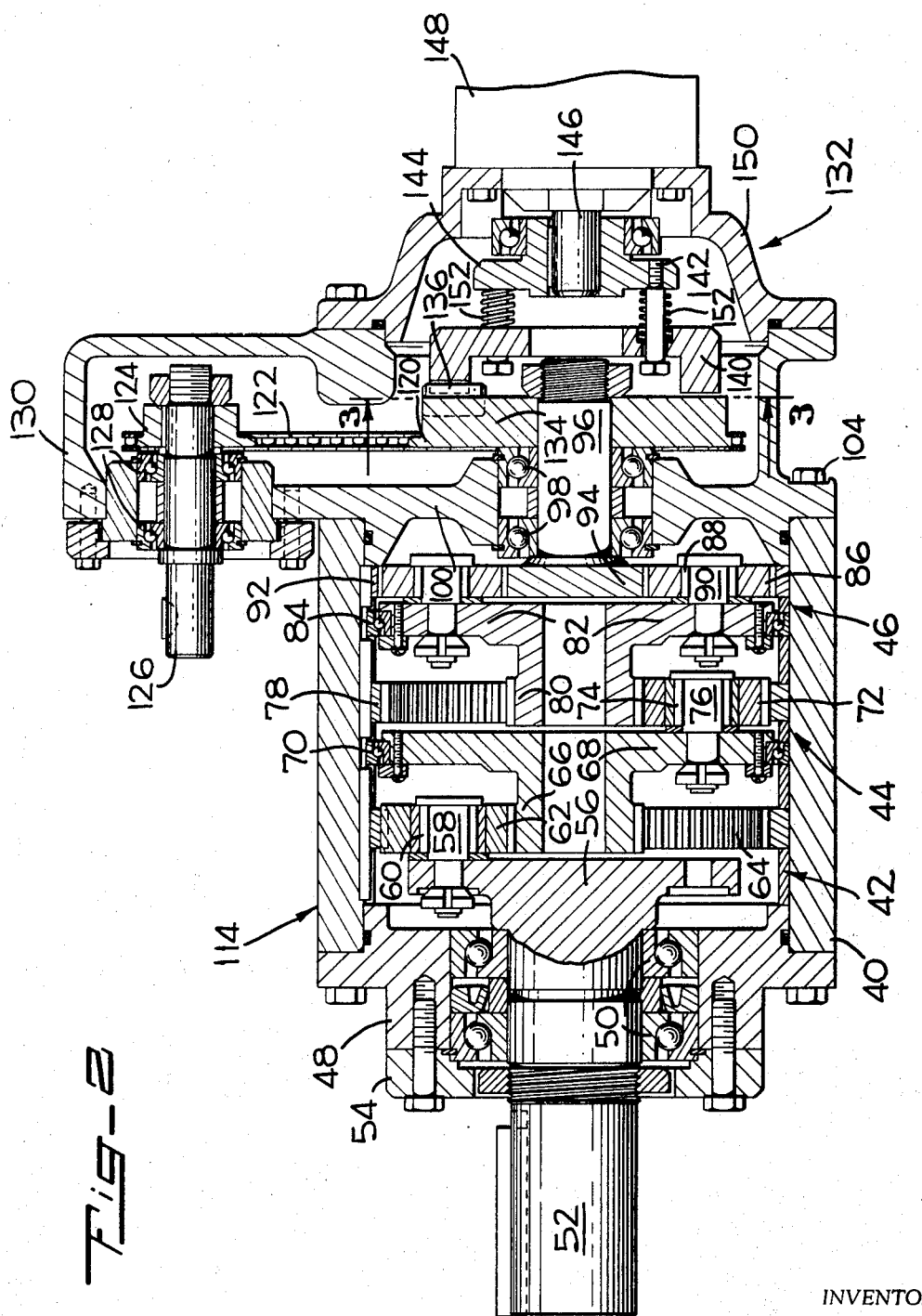
Figure 3:
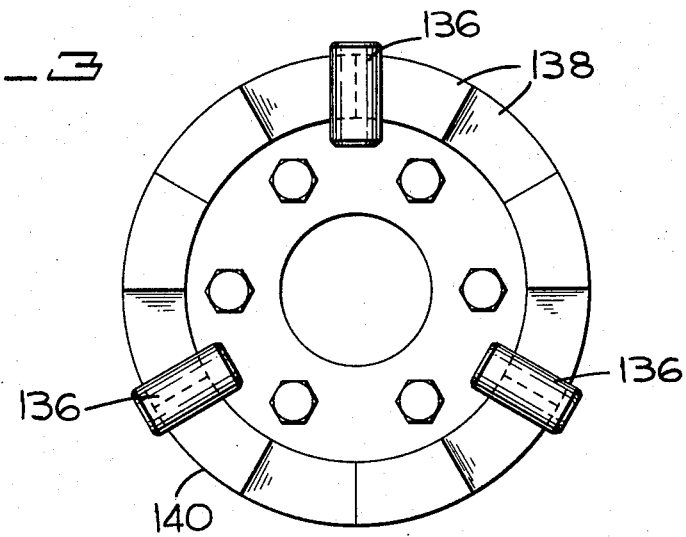

There as well as other objects and features of the invention will become more apparent from the perusal of the following description of the exemplary structure shown in the accompanying drawings wherein:

FIG. 1 is a fragmentary side elevational view of a road grader incorporating, as part of a mechanical feed-back linkage, a transmission embodying the features of the present invention, FIG. 2 is an enlarged central longitudinal sectional view through the transmission, FIG. 3 is an enlarged transverse sectional view taken along line 3–3 of FIG. 2, showing details of an oscillating mechanism which is arranged to add and subtract incremental force components to the transmission.

Figure 4:
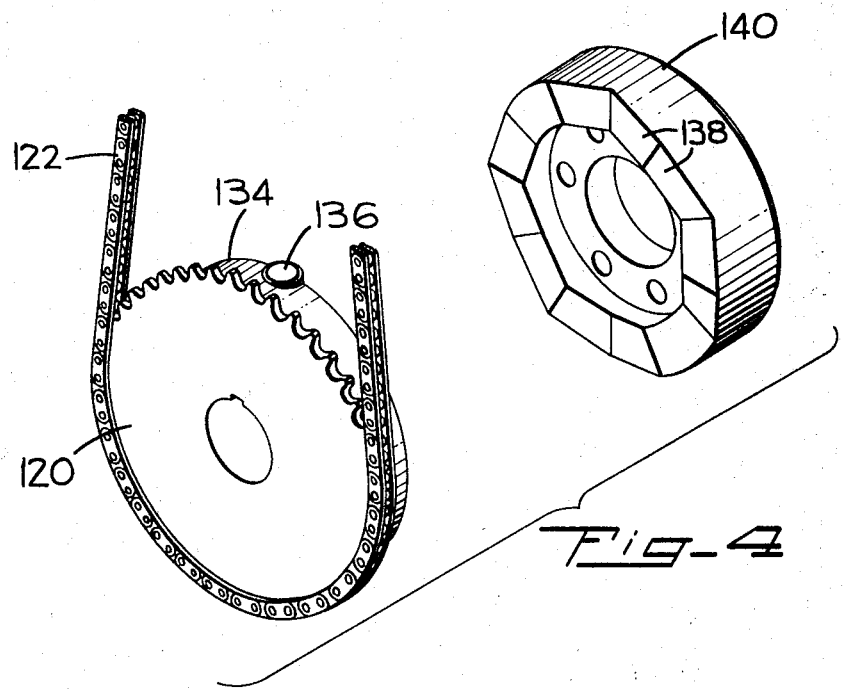

FIG. 4 is an exploded fragmentary perspective view of a portion of the oscillating mechanism, and FIG. 5 is a graphical illustration of the variation in forces experienced through use of the oscillating mechanism shown in FIGS. 2, 3, and 4.

With initial reference to FIG. 1, a portion of a road grader having a blade 30 suspended from a rigid, arched frame 10 for elevational, angular, and cross-slope adjustment is shown, preferably arranged in the manner described in detail in U.S. Patent No. 3,345,976 to which reference is made for details of its construction and operation. Specifically, the cross-slope adjustment of the blade 30 is controlled automatically by a pendulum unit 102 so that if a change in the cross-slope disposition of the frame 10 is experienced, the pendulum will shift to effect a compensating cross-slope adjustment of the blade 30 wherefore, utlimately the desired cross-slope of the graded road bed will be consistenly mainained. In order to de-energize further cross-slope adjustment of the blade 30 when the appropriate disposition has been attained, a feed-back connection from the blade 30 to the pendulum control unit 102 is provided. As explained in detail in the aforementioned specification, a telescopic rod 110 is operatively connected at one end to a member 112 mounted on the blade mounting frame 22 so as to be rotated in one direction or the other in response to any variation in transversable blade disposition. The rod 110 projects forwardly and upwardly and at its remote end is connected by a suitable universal joint 118 to a motion amplifier, generally indicated at 114, which is mounted on the main frame 10 and embodies the features of the present invention as will be presently described. Rotation of the telescopic rod 110 constitutes the input to the motion amplifier 114 and the amplified output therefrom is transmitted by rotation of a series of universally-connected rods 116 which extend rearwardly along the frame for ultimate connection to the pendulum-control unit 102 to provide the feed-back input thereto. Generally, the motion amplifier 114 is arranged to provide a step-up ratio of approximately 150 so that but a small increment of rotation of the input rod 110 effects a sizable rotation of the output rods 116.

For this purpose, the transmission or motion amplifier is arranged as best shown in FIG. 2 including a main housing 40 of generally hollow cylindrical configuration within which three step-up planetary gear stages 42, 44, 46 are mounted as will be described in detail hereinafter. At the left end of the cylindrical housing 40, a secondary bearing housing 48 of reduced diameter is secured thereto so as to support therewithin a pair of spaced ball bearings 50 which are of a precision variety and accurately support the input shaft 52 of the entire structure for concentric rotation relative to the general axis of the housing. An annular cap 54 is removably secured to the bearing housing 48 and closely encompasses the projecting end of the input shaft 52 which, as previously mentioned, is connected by the universal joint 118 to the telescopic rod 110 as shown in FIG. 1.

At its inner extremity within the cylindrical housing 40, the shaft 52 is connected to the first planetary gear stage 42 and preferably forms an integral part of a planet carrier 56 constituting the input element of the first planetary stage. Several spindles 58 are secured in concentric relationship adjacent the outer perimeter of the planet carrier 56 so as to project therefrom in parallel relationship to the rotative axis of the planet carrier and at equal angular intervals. Preferably there are at least two of the spindles 58 mounted on the planet carrier 56 and each spindle mounts by means of a precise needle bearing 60, a planet gear 62 thereon so that the axis of rotation of each planet gear 62 is maintained in precise parallelism to the axis of rotation of the input shaft 52 and the planet carrier 56 mounted thereon. Each planet gear 62 meshes with an interior ring gear 64 rigidly secured within the cylindrical housing 40 and also with a central sun gear 66 mounted in axial alignment with the input shaft 52 and the first planet carrier 56. This sun gear 66 is, in turn, integrally secured to a second planet carrier 68 which constitutes the input element of the second planetary gear stage 44 and is mounted for rotation within precision ballbearings 70 secured within the cylindrical housing 40. As thus far described, it will be apparent that the entire rotative support for the first planetary gear stage 42 is derived from the bearings 50 that support the input shaft 52 and the bearings 70 described immediately above which provide peripheral rotary support for the second planet carrier 68. The number of supporting bearings thus are reduced to a minimum and these bearings are located at exterior rather than interior positions so that the bearing loads are minimized, thus ultimately maintaining frictional forces resulting from the bearings at a minimal level. In addition, the bearing and gear arrangement is such as to maintain precise alignment of the gear teeth, thus to further minimize frictional forces which are known to result from gear teeth misalignment.

The second planetary gear stage 44 is substantially identical with the first gear stage 42 described hereinabove including the described planet carrier 68 and at least two planet gears 72 supported by needle bearings 74 on spindles 76 carried adjacent the periphery of the planet carrier for exterior meshing engagement with an internal ring gear 78 fixed to the interior of the housing 40 and for interior engagement with a second sun gear 80 which is again supported in axial alignment with the first sun gear 66 and the input shaft 52.

In turn, this second sun gear 80 is integrally made a part of a third planet carrier 82 whose periphery is supported in ball bearings 84 carried within the interior of the cylindrical housing 40 to thus provide rotative support for both the planet carrier and the sun gear integrally attached thereto. This planet carrier 82 constitutes the input element of the third planetary gear stage 46 which is generally similar to the first two planetary gear stages 42, 44 including in addition to the planet carrier 82, at least two planet gears 86 rotatively supported by needle bearings 88 on spindles 90 and arranged to mesh exteriorly with an internal ring-gear 92 secured within the cylindrical housing 40 and interiorly with a third sun gear 94 which is again disposed in axial alignment with the other sun gears 66, 80 and the input shaft 52. An intermediate shaft 96 is integrally attached to the third sun gear 94 and is supported within spaced ball bearings 98 mounted with an annular flange 100 secured to the end of the cylindrical housing 40 by suitable bolts 104.

It has been previously mentioned that the described bearing arrangement for the three stages 42, 44, 46 of planetary gears minimizes frictional losses. It is also known that a planetary gear stage which utilizes a planet-carrier input, sun gear output, and two or more connecting planets inherently reduces both bearing and gear tooth friction to a minimum. Finally, it can be demonstrated that if multiple stages of step-up gear ratios are required to meet a design criteria for a motion-amplifying transmission, an equating of the step-up ratio of the individual stages effects minimal frictional losses from planet bearings and gear tooth engagement. In accordance with this design criteria, the first stage 42 of the described transmission has a step-up ratio of one to four; the second stage 44 has a one to four ratio; and the third stage 46 has a one to three and four/sevenths step-up ratio so that the ratios of the three stages are substantially equal.

The described intermediate shaft 96 projects beyond its supporting bearings 98 and carries a sprocket 120 about which is trained a sprocket chain 122. The sprocket chain 122 extends upwardly for operative connection to a smaller sprocket 124 secured to the output shaft 126 of the transmission, such output shaft being supported in spaced ball bearings 128 suitably carried in a secondary housing 130 which extends laterally above the described cylindrical housing 40 wherefore the described output shaft 126 projects to the left above the cylindrical housing 40 for connection to the previously described series of output rods 116. As shown, the large sprocket 120 has sixty-six teeth and the smaller sprocket 124 has twenty-four teeth so that an additional step-up ratio of one to two and three-quarters is attained, the overall motion amplification of the entire unit accordingly being 1100/7 or approximately $50\pi$.

While it will be apparent from the foregoing description that frictional forces are minimized in the transmission, the accuracy of motion amplification is yet further increased by applying a torque preload to the transmission.

More particularly, a torsional pre-load, always acting in a single direction, is applied to the transmission 114 and the associated rods 110, 116 wherefore the gear teeth and other motion-transmitting elements are always maintained in the same contacting positions thus to eliminate inaccuracy effects such as gear lash. In addition the torsional pre-load is varied so that periodically, slight opposing motions of the transmission elements are effected wherefore first a positive, then a negative frictional force is experienced, and the overall summation or integration of position correlation of the input and output elements of the transmission constitutes an average within which the frictional losses are balanced out.

Preferably, the variable torsional pre-load is applied to the intermediate shaft 96 from an oscillating mechanism 132 but the loading effects are ultimately applied throughout the transmission elements as well as the associated input and output connections.

Such oscillating mechanism 132 includes a plate 134 that is secured to the end of the intermediate shaft 96 adjacent the described large sprocket 120 as shown in detail in FIGS. 3 and 4 and is formed with three radial pockets at 120° intervals in its peripheral edges for the pressed-fit reception of dowel pins 136 which project laterally from the surface of the plate 134 for lateral engagement with the angular cam surfaces 138 formed on the side and adjacent the periphery of a rotary cam 140 that is connected by a number of pins 142 to the annular flange of a drive member 144 mounted on the output shaft 146 of a fluid motor 148 which is of conventional design and is suitably mounted on a closure plate 150 bolted at its periphery to the secondary housing 130 in a fashion such that the output shaft 146 of the fluid motor 148 is aligned axially with the previously described intermediate shaft 96. The drive pins 142 for the rotary cam 140 are each encompassed by compressed coil springs 152 which, accordingly, urge the surfaces 138 of the rotary cam against the described dowel pins 136 thus maintaining resilient contact therebetween.

The contacting surface 138 of the rotary cam 140 alternately rises and falls as one progresses circumferentially around its surface so that a plurality of alternating troughs and ridges of generally V-shaped configuration are formed, the bottom of the V preferably being disposed 30° from the adjacent top of the V. Preferably, both the upwardly and downwardly sloping cam surfaces lie at an angle of 5° relative to a plane perpendicular to the rotative axis of the rotary cam 140, and although not illustrated, the tops and bottoms of the surface 138 can be rounded.

When the oscillating mechanism 132 is energized by supply of hydraulic fluid to the motor 148, it will rotate, preferably at a speed of approximately 80 revolutions per minute. Depending on the direction of rotation of the motor, a frictional force will be generated between the cam surface 138 and the dowel pins 136, tending to turn all elements of the transmission 114 as well as the input and output rods 110, 116 in the direction of fluid motor rotation. This torsional force is preferably established at an average value of 4000 inch-pounds measured at the input rod 110 as determined primarily by the strength of the springs 152 and if the cam surface 138 were flat, this average torsional pre-load force, F, would be maintained constantly as indicated by the dotted line, F. in FIG. 5. However, since the cam surface 138 rises and falls, the torsional force varies, first positively and then negatively by an amount, ΔF, as indicated by the full-line square wave appearing in FIG. 5, and as determined by the degree of slope of the cam surface 138. If such surface is rounded, the illustrated square wave would then appear as substatnially a sinpsoidal wave form. While the torsional force varies, it is to be expressly understood hat a positibe albeit variable value is always maintained. Accordingly, identical contact is maintained between the gear teeth and other transmitting elements wherefore gear lash and similar effects are eliminated. In addition, the variable force F is sufficient to impart periodically a minimal amount of motion to the transmission first in one direction, then in the opposite direction wherefore frictional forces first in one direction and then in the other are experienced, essentially following the shape of the full-line wave form. Since the frictional forces add and subtract, the average thereof is zero and, as a consequence, frictional losses do not affect the correlation of position register between the input rod 110 and the output rods 116. Ultimately, the output of the transmission is precisely correlated with the input motion and it has been found in practice that the motion threshold of the transmission is substantially zero.

It will be apparent that many modifications and alterations in the structure as specifically described can be made without departing from the spirit of the invention and the foregoing description of one embodiment is accordingly to be considered purely as exemplary and not in a limiting sense. The actual scope of the invention is to be indicated only by reference to the appended claims.

What is claimed is:
1. A transmission which comprises
a plurality of motion-transmitting elements, and
means for applying a variable resilient force greater or lesser periodically than a constant predetermined force in one direction to said elements.
2. A transmission according to claim 1 wherein
said force-applying means applies a variable force to said motion-transmitting elements in an amount sufficient to effect a minimal periodic reversal of motion thereof.
3. A transmission according to claim 2 wherein
said motion-transmitting elements are rotary and
said resilient force constitutes a variable torsional force.
4. A transmission according to claim 3 wherein
said force applying means includes a rotary cam surface of rising and falling configuration and
a cam attached to one of said transmission elements and in resilient frictional contact with said cam surface.
5. A transmission which comprises
an input shaft,
an output shaft,
means operably connecting said shaft including a plurality of motion-changing stages,
each of said stages constituting a planet carrier input, sun gear output arrangement, and
means for applying a variable resilient force component greater or lesser periodically than a constant predetermined torsional force to the sun gear constituting the output element of said plurality of motion-changing stages.

References Cited

UNITED STATES PATENTS

| 3,359,819 | 12/1967 | Veillette et al. | 74—409 |
| 2,966,806 | 1/1961 | Luning | 74—409 |
| 2,564,271 | 8/1951 | Millns | 74—785 |
| 2,591,967 | 4/1952 | Ridgely et al. | 74—801 |
| 2,679,167 | 5/1954 | Nickinson | 74—409 |
| 2,815,974 | 12/1957 | Stubbe | 74—785 X |
| 2,896,601 | 7/1959 | Troeger et al. | 74—801 X |
| 3,166,952 | 1/1965 | Lang | 74—409 X |

ARTHUR T. McKEON, *Primary Examiner.*

U.S. Cl. X.R.

74—801